(12) United States Patent
Henry et al.

(10) Patent No.: US 8,734,062 B2
(45) Date of Patent: May 27, 2014

(54) CUTTING INSERT ASSEMBLY AND COMPONENTS THEREOF

(71) Applicant: Kennametal Inc., Latrobe, PA (US)

(72) Inventors: Nicholas J. Henry, Latrobe, PA (US); Shi Chen, North Huntingdon, PA (US); Kent P. Mizgalski, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 13/679,435

(22) Filed: Nov. 16, 2012

(65) Prior Publication Data

US 2013/0078043 A1   Mar. 28, 2013

Related U.S. Application Data

(63) Continuation-in-part of application No. 12/874,591, filed on Sep. 2, 2010.

(51) Int. Cl.
*B23B 27/10* (2006.01)

(52) U.S. Cl.
USPC ............................................. 407/11; 407/102

(58) Field of Classification Search
USPC ................. 407/11, 113, 101–107; 408/56, 57
See application file for complete search history.

(56) References Cited

U.S. PATENT DOCUMENTS

| | | |
|---|---|---|
| 2,870,523 A | 1/1959 | Richard |
| 3,077,802 A | 2/1963 | Philip |
| 3,323,195 A | 6/1967 | Vanderjagt |
| 3,429,700 A | 2/1969 | Wiegand et al. |
| 3,486,378 A | 12/1969 | Carlson |
| 3,571,877 A | 3/1971 | Zerkle |
| 3,798,726 A | 3/1974 | Dudley |
| 3,889,520 A | 6/1975 | Stoferle et al. |
| 3,971,114 A | 7/1976 | Dudley |
| 4,012,061 A | 3/1977 | Olson |
| 4,123,194 A | 10/1978 | Cave |
| 4,204,787 A | 5/1980 | McCray et al. |

(Continued)

FOREIGN PATENT DOCUMENTS

| | | |
|---|---|---|
| DE | 3004166 C2 | 2/1980 |
| DE | 3429842 A1 | 2/1986 |

(Continued)

OTHER PUBLICATIONS

A.S.T.M. Tool Engineers Handbook McGraw Hill Book Co. New York, NY (1949) pp. 302-315.

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

A cutting assembly useful for the chipforming removal of material from a workpiece at the cutting insert-workpiece interface. The cutting assembly has a holder with a coolant passage and a seat. As one option, a stud extends away from the seat and facilitates coolant flow to an insert locking cap, which attaches to the stud. The insert locking cap directs coolant flow toward the cutting insert-workpiece interface. As another option, a diverter plate has a bottom surface with a bowl and an arcuate forward surface with one or more openings. Coolant flows from the coolant passage into the bowl then exits through at least one opening in the arcuate forward surface towards the cutting insert-workpiece interface.

11 Claims, 17 Drawing Sheets

(56) References Cited

U.S. PATENT DOCUMENTS

| | | |
|---|---|---|
| 4,276,085 A | 6/1981 | Wisell |
| 4,340,324 A | 7/1982 | McCreery |
| 4,437,800 A | 3/1984 | Araki et al. |
| 4,535,216 A | 8/1985 | Cassidenti |
| 4,579,488 A | 4/1986 | Griffin |
| 4,682,916 A | 7/1987 | Briese |
| 4,813,831 A | 3/1989 | Reinauer |
| 4,848,198 A | 7/1989 | Royal et al. |
| 4,861,203 A | 8/1989 | Bassett et al. |
| 4,880,461 A | 11/1989 | Lichida |
| 4,880,755 A | 11/1989 | Mehrotra |
| 4,881,431 A | 11/1989 | Bieneck |
| 4,955,264 A | 9/1990 | Armbrust |
| 5,024,976 A | 6/1991 | Mehrotra et al. |
| 5,148,728 A | 9/1992 | Mazurkiewicz |
| 5,163,790 A | 11/1992 | Vig |
| RE34,180 E | 2/1993 | Nemeth et al. |
| 5,222,843 A | 6/1993 | Katbi et al. |
| 5,237,894 A | 8/1993 | Lindeke |
| 5,252,119 A | 10/1993 | Nishida et al. |
| 5,265,985 A | 11/1993 | Boppana et al. |
| 5,275,633 A | 1/1994 | Johansson et al. |
| 5,288,186 A | 2/1994 | Kovacevic |
| 5,290,135 A | 3/1994 | Ball et al. |
| 5,316,323 A | 5/1994 | Jovanovic |
| 5,333,520 A | 8/1994 | Fischer et al. |
| 5,340,242 A * | 8/1994 | Armbrust et al. ............ 407/11 |
| 5,346,335 A | 9/1994 | Harpaz et al. |
| 5,388,487 A | 2/1995 | Danielsen |
| 5,439,327 A | 8/1995 | Wertheim |
| D363,076 S | 10/1995 | Hansson et al. |
| D364,178 S | 11/1995 | Hansson et al. |
| D369,362 S | 4/1996 | Pantzar et al. |
| 5,516,242 A | 5/1996 | Andronica |
| 5,525,134 A | 6/1996 | Mehrotra |
| 5,542,792 A | 8/1996 | Krueger et al. |
| 5,554,338 A | 9/1996 | Sugihara et al. |
| 5,565,156 A | 10/1996 | Ingelstrom |
| 5,707,185 A | 1/1998 | Mizutani |
| 5,718,156 A | 2/1998 | Lagrolet et al. |
| 5,733,075 A | 3/1998 | Basteck |
| 5,738,468 A | 4/1998 | Boianjiu |
| 5,761,974 A | 6/1998 | Wang et al. |
| 5,775,854 A | 7/1998 | Wertheim |
| 5,816,753 A | 10/1998 | Hall |
| 5,826,469 A | 10/1998 | Haradem |
| 5,829,331 A | 11/1998 | Mori |
| 5,901,623 A | 5/1999 | Hong |
| 5,955,186 A | 9/1999 | Grab |
| 5,975,817 A | 11/1999 | Komine |
| 6,010,283 A | 1/2000 | Henrich et al. |
| 6,045,300 A | 4/2000 | Antoun |
| 6,050,756 A | 4/2000 | Buchholz et al. |
| 6,053,669 A | 4/2000 | Lageberg |
| 6,056,486 A | 5/2000 | Colvin |
| 6,117,533 A | 9/2000 | Inspektor |
| 6,124,040 A | 9/2000 | Kolaska et al. |
| 6,164,169 A | 12/2000 | Goff |
| 6,287,058 B1 | 9/2001 | Arai et al. |
| 6,287,682 B1 | 9/2001 | Grab et al. |
| 6,299,388 B1 | 10/2001 | Slabe |
| 6,312,199 B1 | 11/2001 | Sjoden et al. |
| 6,322,746 B1 | 11/2001 | LaSalle et al. |
| 6,350,510 B1 | 2/2002 | Konig et al. |
| 6,394,709 B1 | 5/2002 | Sjoo et al. |
| 6,443,672 B1 | 9/2002 | Lagerberg |
| 6,447,218 B1 | 9/2002 | Lagerberg |
| 6,447,890 B1 | 9/2002 | Leverenz et al. |
| 6,450,738 B1 | 9/2002 | Ripley |
| 6,471,448 B1 | 10/2002 | Lagerberg |
| 6,521,349 B1 | 2/2003 | Konig et al. |
| 6,528,171 B1 | 3/2003 | Endler et al. |
| 6,551,551 B1 | 4/2003 | Gegel et al. |
| 6,575,672 B1 | 6/2003 | Maier |
| 6,595,727 B2 | 7/2003 | Arvidsson |
| 6,634,835 B1 | 10/2003 | Smith |
| 6,637,984 B2 | 10/2003 | Murakawa et al. |
| 6,648,565 B2 | 11/2003 | Schweizer |
| 6,652,200 B2 | 11/2003 | Kraemer |
| 6,705,805 B2 | 3/2004 | Lagerberg |
| 6,708,590 B2 | 3/2004 | Lagerberg |
| 6,769,335 B2 | 8/2004 | Kaminski |
| D496,950 S | 10/2004 | Waggle et al. |
| D497,923 S | 11/2004 | Waggle et al. |
| 6,860,172 B2 | 3/2005 | Hecht |
| 6,884,499 B2 | 4/2005 | Penich et al. |
| 6,905,992 B2 | 6/2005 | Mehrotra |
| 6,913,428 B2 | 7/2005 | Kress et al. |
| 6,957,933 B2 | 10/2005 | Pachao-Morbitzer et al. |
| 6,998,173 B2 | 2/2006 | Liu et al. |
| 7,094,717 B2 | 8/2006 | Yeckley |
| 7,125,205 B2 | 10/2006 | Sheffler |
| 7,125,207 B2 | 10/2006 | Craig et al. |
| 7,160,062 B2 | 1/2007 | Tran |
| 7,252,024 B2 | 8/2007 | Zurecki et al. |
| 7,273,331 B2 | 9/2007 | Giannetti |
| D555,684 S | 11/2007 | Waggle et al. |
| 7,309,466 B2 | 12/2007 | Heinrich et al. |
| 7,396,191 B2 | 7/2008 | Fujimoto et al. |
| 7,407,348 B2 | 8/2008 | Sjogren et al. |
| 7,510,352 B2 | 3/2009 | Craig |
| 7,530,769 B2 | 5/2009 | Kress et al. |
| 7,611,310 B2 * | 11/2009 | Isaksson ............ 407/11 |
| 7,621,700 B2 | 11/2009 | Jonsson et al. |
| 7,634,957 B2 | 12/2009 | Ghosh et al. |
| 7,641,422 B2 | 1/2010 | Berminge et al. |
| 7,687,156 B2 | 3/2010 | Fang et al. |
| 2001/0007215 A1 | 7/2001 | Murata et al. |
| 2002/0106250 A1 | 8/2002 | Murakawa et al. |
| 2003/0017014 A1 | 1/2003 | Morgulis et al. |
| 2003/0082018 A1 | 5/2003 | Kraemer |
| 2003/0095841 A1 | 5/2003 | Kraemer |
| 2004/0240949 A1 | 12/2004 | Pachao-Morbitzer et al. |
| 2005/0186039 A1 | 8/2005 | Muller et al. |
| 2006/0053987 A1 | 3/2006 | Ghosh |
| 2006/0140728 A1 | 6/2006 | Giannetti |
| 2006/0171837 A1 | 8/2006 | Heinrich et al. |
| 2006/0263153 A1 | 11/2006 | Isaksson |
| 2008/0175676 A1 | 7/2008 | Prichard |
| 2008/0175677 A1 | 7/2008 | Prichard et al. |
| 2008/0175678 A1 | 7/2008 | Prichard |
| 2008/0175679 A1 | 7/2008 | Prichard |

FOREIGN PATENT DOCUMENTS

| | | |
|---|---|---|
| DE | 3740814 A1 | 12/1987 |
| EP | 100376 A2 | 2/1984 |
| EP | 0599393 B1 | 2/1996 |
| EP | 0932460 B1 | 6/2003 |
| FR | 1279749 | 1/1961 |
| FR | 2244590 | 9/1973 |
| JP | 5669007 A2 | 6/1981 |
| JP | 60127904 A | 7/1985 |
| JP | 04183503 A2 | 6/1992 |
| JP | 05301104 | 11/1993 |
| JP | 06083205 U | 11/1994 |
| JP | 07227702 A2 | 8/1995 |
| JP | 07237006 | 9/1995 |
| JP | 08025111 A | 1/1996 |
| JP | 08039387 | 2/1996 |
| JP | 08039387 A | 2/1996 |
| JP | 09262706 A | 10/1997 |
| JP | 10094904 A2 | 4/1998 |
| JP | 2000280106 A | 10/2000 |
| JP | 2001113408 A | 4/2001 |
| JP | 2001239420 A | 9/2001 |
| JP | 2003053622 A | 2/2003 |
| JP | 2003266207 A2 | 9/2003 |
| JP | 2003266208 A2 | 9/2003 |
| JP | 2004122262 A | 4/2004 |
| JP | 2005279900 A2 | 10/2005 |
| JP | 06136953 A | 6/2006 |
| KR | 1020060027154 A | 3/2006 |
| KR | 1020060054916 A | 5/2006 |

(56) References Cited

FOREIGN PATENT DOCUMENTS

| | | |
|---|---|---|
| KR | 1020090094250 | 9/2009 |
| WO | 9830349 A1 | 7/1998 |
| WO | 0076697 A2 | 12/2000 |
| WO | 0158632 A1 | 8/2001 |
| WO | 2010096014 A1 | 8/2010 |

OTHER PUBLICATIONS

Moltrecht, K.H. Machine Shop Practice, Industrial Press Inc. New York, NY (1981) pp. 199-204.

Santhanam et al. "Cemented Carbides", Metals Handbook, vol. 2, 10th Edition, Properties and Selection, ASM International (1990) pp. 950-977.

Wertheim et al., "Influence of High-Pressure Flushing through the Rake Face of a Cutting Tool", Annuals of the CIRP, vol. 41/1 (1992) pp. 101-106.

PCT/US2011/046986 Notification of Transmittal of International Search Report and Written Opinion, (2 pages) mailed Mar. 23, 2012.

PCT/US2011/046986 International Search Report, (4 pages) mailed Mar. 23, 2012.

PCT/US2011/046986 Written Opinion (5 pages) mailed Mar. 23, 2012.

\* cited by examiner

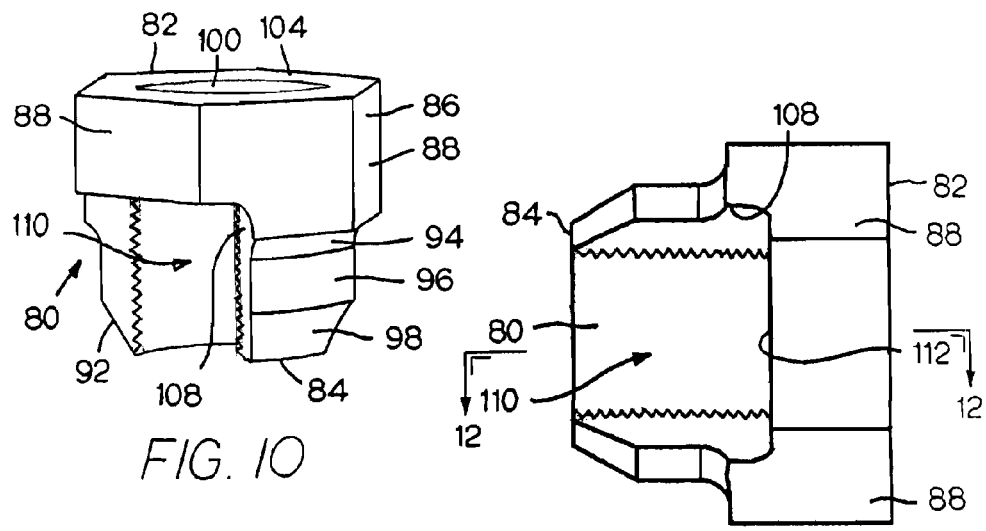
FIG. 10
FIG. 11
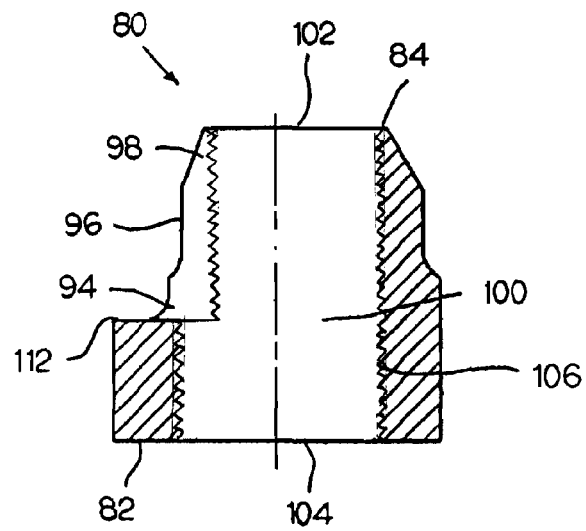
FIG. 12

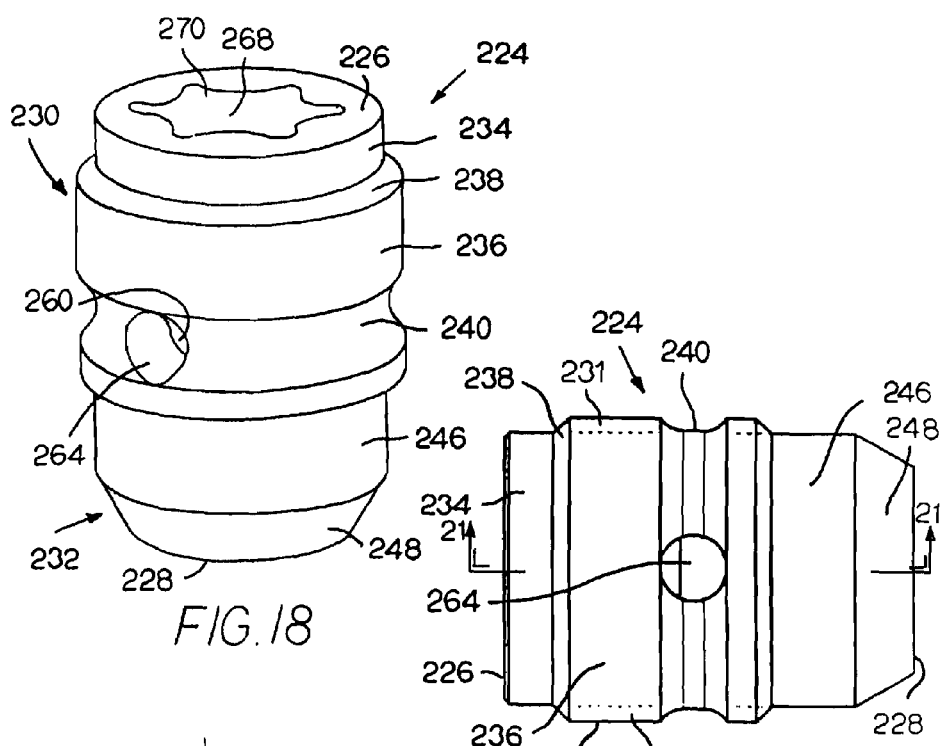
FIG.18
FIG.19
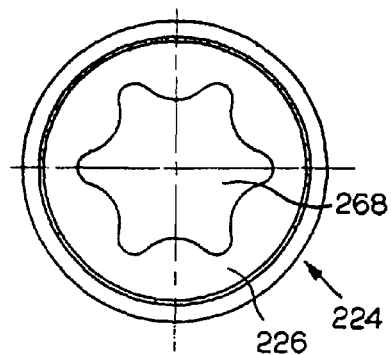
FIG.20
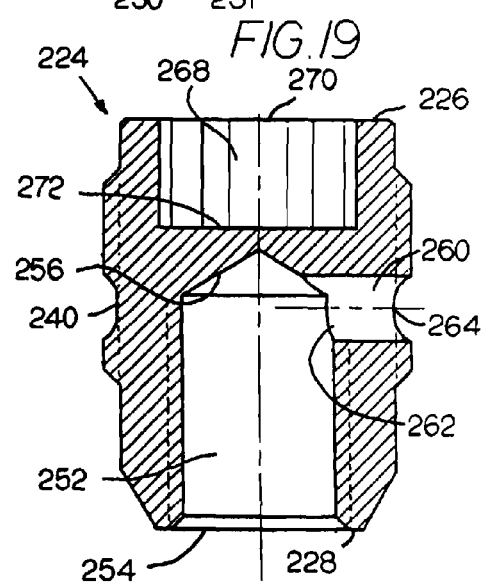
FIG.21

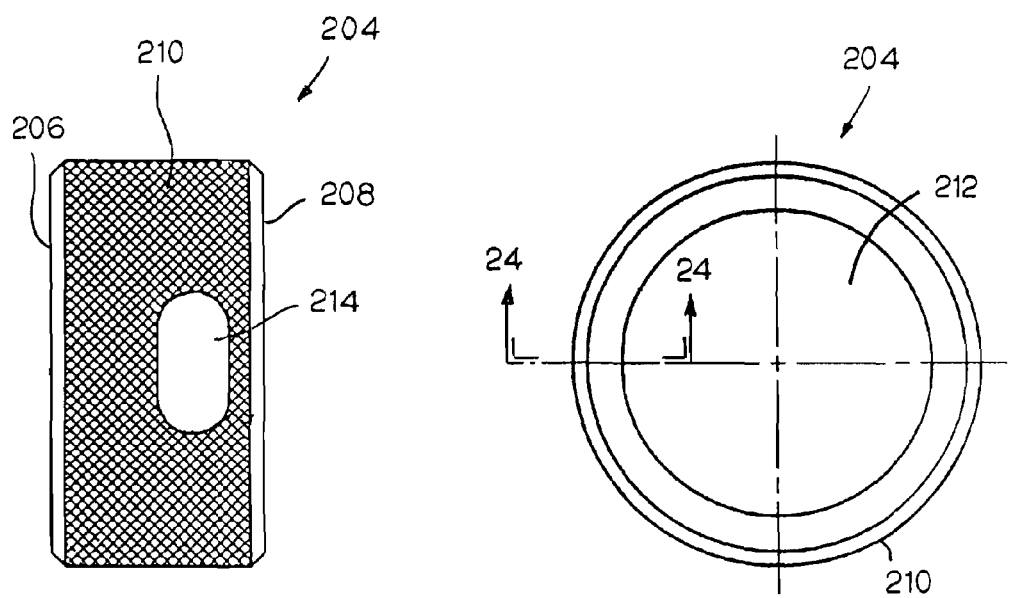
FIG. 22
FIG. 23
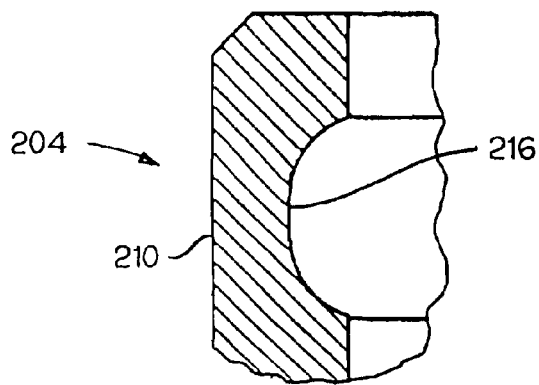
FIG. 24

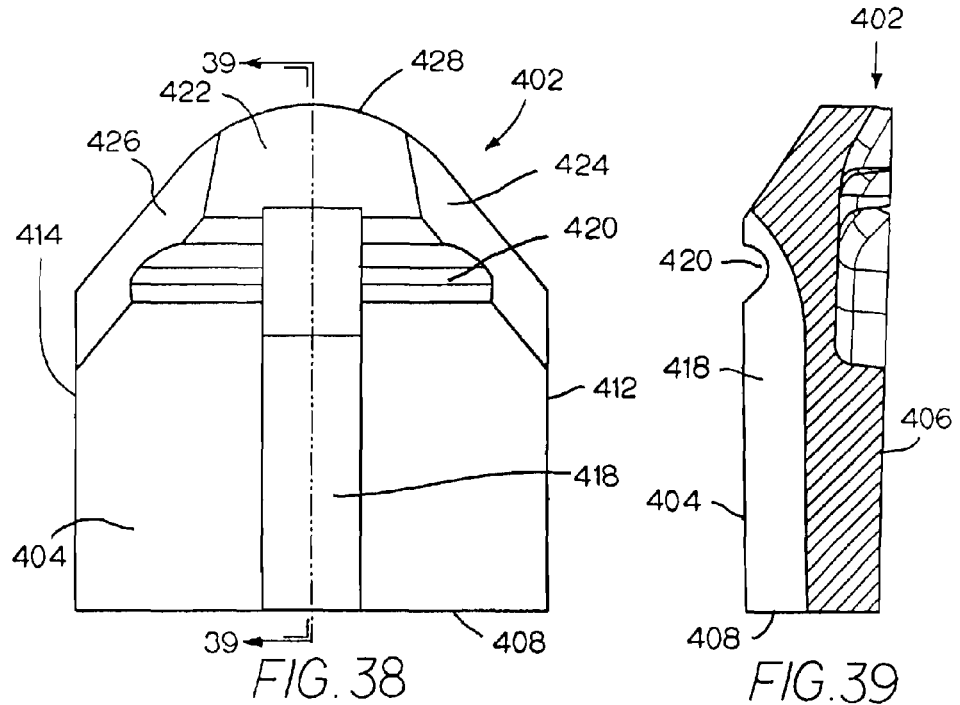
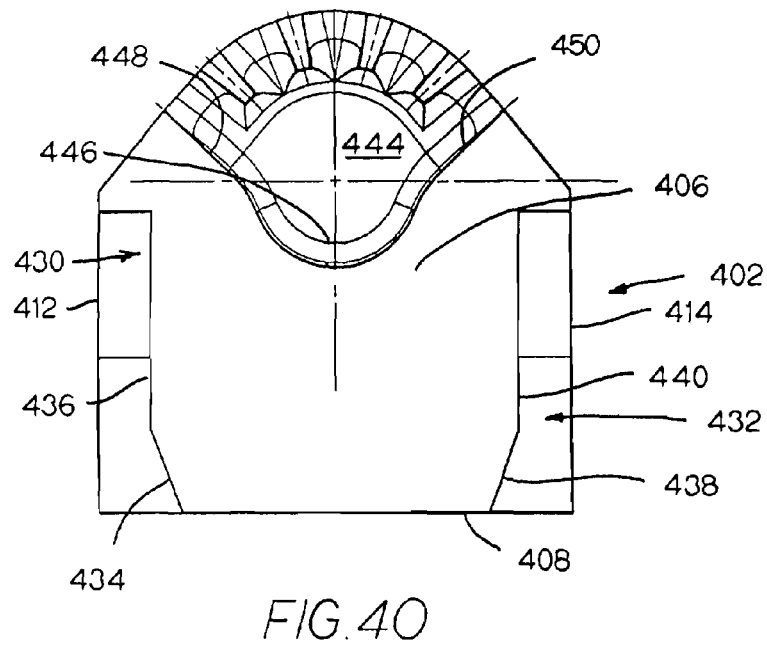

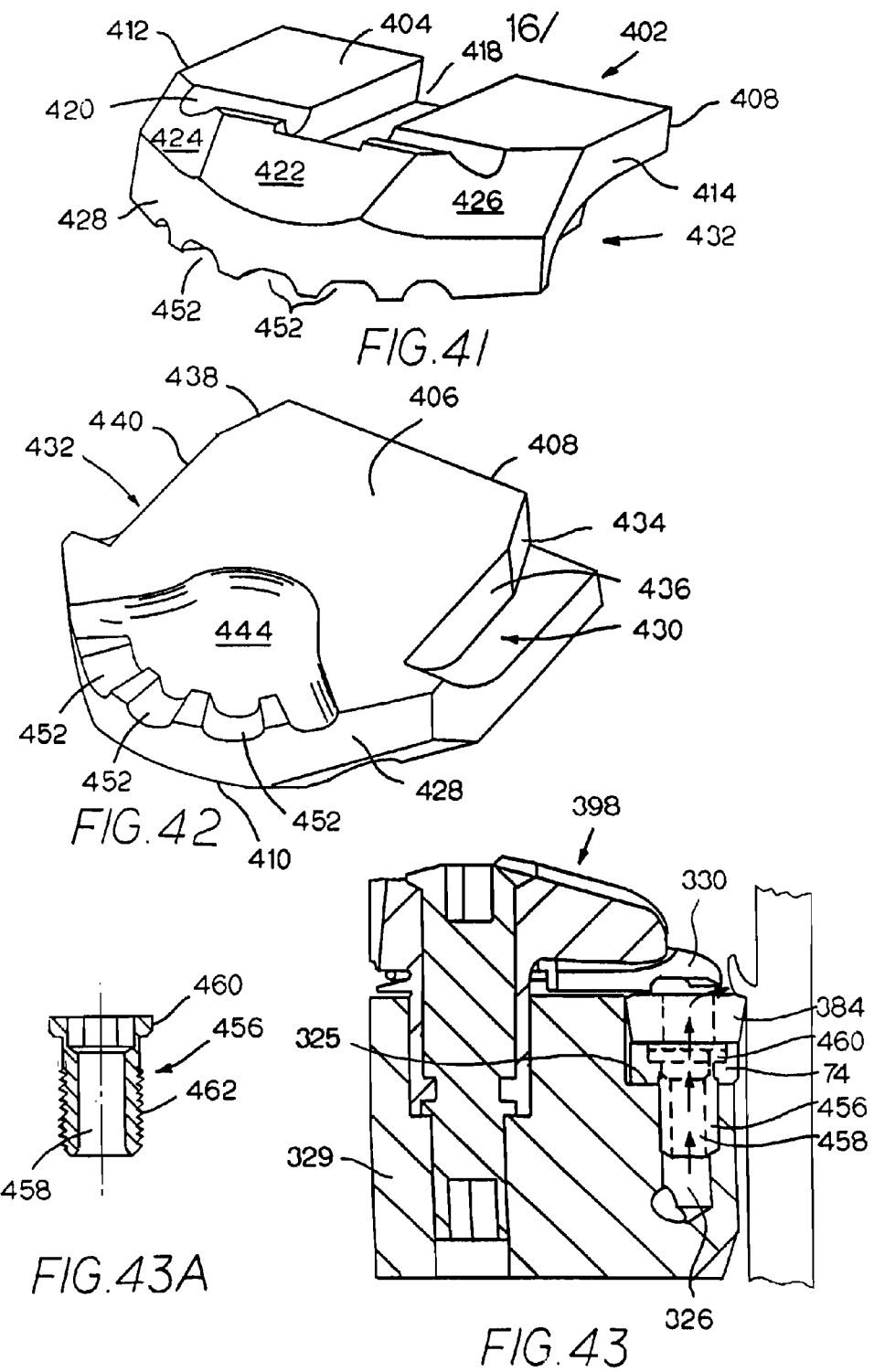

CUTTING INSERT ASSEMBLY AND COMPONENTS THEREOF

CROSS-REFERENCE TO EARLIER PATENT APPLICATIONS

This patent applications is a continuation-in-part of pending U.S. patent application Ser. No. 12/874,591 filed on Sep. 2, 2010 by Chen et al. for CUTTING INSERT ASSEMBLY AND COMPONENTS THEREOF. Applicants hereby claim priority based upon said U.S. patent application Ser. No. 12/874,591 filed on Sep. 2, 2010 by Chen et al. for CUTTING INSERT ASSEMBLY AND COMPONENTS THEREOF. Further, applicants hereby incorporate herein in its entirety such U.S. patent application Ser. No. 12/874,591 filed on Sep. 2, 2010 by Chen et al. for CUTTING INSERT ASSEMBLY AND COMPONENTS THEREOF.

BACKGROUND OF THE INVENTION

The subject invention is directed to a metal cutting system and, in particular, to a metal cutting system adapted to facilitate enhanced delivery of coolant adjacent the interface between the cutting insert and the workpiece (i.e., the insert-chip interface) to diminish excessive heat at the insert-chip interface in the chipforming removal of material from a workpiece. The subject invention is directed further to components of such metal cutting systems. Such components include, for example, a locking pin, a clamp assembly, a holder, a shim and a cutting insert.

Metal cutting tools for performing metal working operations generally comprise a cutting insert having a surface terminating at a cutting edge and a tool holder formed with a seat adapted to receive the insert. The cutting insert engages a workpiece to remove material, and in the process forms chips of the material. Excessive heat at the insert-chip interface can negatively impact upon (i.e., reduce or shorten) the useful tool life of the cutting insert.

For example, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or reduce build up of chip material.

As another example, in a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the milling insert to re-cut a chip already removed from the workpiece. A flow of coolant to the insert-chip interface will facilitate the evacuation of chips from the insert-chip interface thereby minimizing the potential that a chip will be re-cut.

There is an appreciation that a shorter useful tool life increases operating costs and decreases overall production efficiency. Excessive heat at the insert-chip interface contribute to the welding of chip material and re-cutting of chips, both of which are detrimental to production efficiency. There are readily apparent advantages connected with decreasing the heat at the insert-chip interface wherein one way to decrease the temperature is to supply coolant to the insert-chip interface.

Heretofore, systems operate to lower the cutting insert temperature during cutting. For example, some systems use external nozzles to direct coolant at the cutting edge of the insert. The coolant serves not only to lower the temperature of the insert but also to remove the chip from the cutting area. The nozzles are often a distance of one to twelve inches away from the cutting edge. This is too far of a distance for effective cooling. The farther the coolant must travel, the more the coolant will mix with air and the less likely it will be to contact the tool-chip interface.

U.S. Pat. No. 6,053,669 to Lagerberg for CHIP FORMING CUTTING INSERT WITH INTERNAL COOLING discusses the importance of reducing the heat at the insert-chip interface. Lagerberg mentions that when a cutting insert made from cemented carbide reaches a certain temperature, its resistance to plastic deformation decreases. A decrease in plastic deformation resistance increases the risk for breakage of the cutting insert. U.S. Pat. No. 5,775,854 to Wertheim for METAL CUTTING TOOL points out that a rise in the working temperature leads to a decrease in hardness of the cutting insert. The consequence is an increase in wear of the cutting insert.

Other patent documents disclose various ways or systems to deliver coolant to the insert-chip interface. For example, U.S. Pat. No. 7,625,157 to Prichard et al. for MILLING CUTTER AND MILLING INSERT WITH COOLANT DELIVERY pertains to a cutting insert that includes a cutting body with a central coolant inlet. The cutting insert further includes a positionable diverter. The diverter has a coolant trough, which diverts coolant to a specific cutting location.

U.S. Pat. No. 6,045,300 to Antoun for TOOL HOLDER WITH INTEGRAL COOLANT PASSAGE AND REPLACEABLE NOZZLE discloses using high pressure and high volume delivery of coolant to address heat at the insert-chip interface. U.S. Pat. No. 6,652,200 to Kraemer for a TOOL HOLDER WITH COOLANT SYSTEM discloses grooves between the cutting insert and a top plate. Coolant flows through the grooves to address the heat at the insert-chip interface. U.S. Pat. No. 5,901,623 to Hong for CRYOGENIC MACHINING discloses a coolant delivery system for applying liquid nitrogen to the insert-chip interface.

SUMMARY OF THE INVENTION

The inventor(s) have recognized the problems associated with conventional cooling apparatus and have developed an insert assembly that works with a conventional coolant system to deliver coolant to a cutting insert that addresses the problems of the prior art.

In one form thereof, the invention is a cutting assembly for the chipforming removal of material from a workpiece at the cutting insert-workpiece interface. The cutting assembly comprises a holder containing a coolant passage and a seat. There is a stud that is received within the coolant passage wherein the stud extends away from the seat. The assembly further includes a cutting insert that has a rake surface and a central aperture wherein the stud extends through the central aperture of the cutting insert. The assembly includes an insert locking cap engaging the stud and exerting a biasing force against the rake surface of the cutting insert so as to securely retain the cutting insert in the seat. The insert locking cap contains a side opening in communication with the central aperture of the cutting insert. The stud contains an exterior longitudinal trough with an entrance in the coolant passage and an exit adjacent the side opening whereby coolant flows from the coolant passage into the exterior longitudinal troughs exiting into the central aperture of the cutting insert and passing into and spraying out of the side opening toward the cutting insert-workpiece interface.

In another form thereof, the invention is a cutting assembly for the chipforming removal of material from a workpiece at the cutting insert-workpiece interface. The cutting assembly comprises a holder containing a coolant passage and a seat. The assembly includes a threaded stud threadedly received at a lower threaded section thereof within the coolant passage and extending away from the seat. The assembly includes a cutting insert that has a rake surface and a central aperture wherein an upper threaded section of the threaded stud extends through the central aperture of the cutting insert. There is an insert locking cap that engages the upper threaded section of the threaded stud whereby the insert locking cap exerts biasing force against the rake surface of the cutting insert so as to securely retain the cutting insert in the seat. The insert locking cap contains a transverse locking cap bore and an outer exit in communication with the transverse locking cap bore. The insert locking cap contains an exterior annular groove in communication with the transverse locking cap bore through the outer exit. A coolant ring, which is adjustable, is received on the insert locking cap so as to encompass the exterior annular groove. The coolant ring contains an interior groove which together with the exterior annular groove forms a coolant channel. The coolant ring contains an opening in communication with the coolant channel. The threaded stud contains a central longitudinal bore with an entrance in the coolant passage and an exit adjacent the transverse locking cap bore whereby coolant flows from the coolant passage and into the central longitudinal bore exiting into the transverse locking cap bore and passing into the coolant channel whereby coolant sprays out of the opening toward the cutting insert-workpiece interface.

In yet another form thereof, the invention is a diverter plate for use with a cutting assembly that has a holder that contains a coolant passage for the chipforming removal of material from a workpiece at the cutting insert-workpiece interface. The diverter plate comprises a bottom surface wherein the bottom surface contains a bowl. The diverter plate further contains an arcuate forward surface containing an opening (380,452). Coolant flows from the coolant passage into the bowl then exits through the opening in the arcuate forward surface towards the cutting insert-workpiece interface.

BRIEF DESCRIPTION OF THE DRAWINGS

The following is a brief description of the drawings that form a part of this patent application:

FIG. 10 is an isometric view of the insert locking cap, which is a part of the cutting unit assembly of FIG. 1;

FIG. 11 is a side view of the insert locking cap of FIG. 10;

FIG. 12 is a cross-sectional view of the insert locking cap of FIG. 10 taken along section line 12-12 in FIG. 11;

FIG. 18 is an isometric view of the insert locking cap that is a part of a second specific embodiment of a cutting unit assembly;

FIG. 19 is a side view of the insert locking cap of FIG. 18;

FIG. 20 is a top view of the insert locking cap of FIG. 18;

FIG. 21 is a cross-sectional view of the insert locking cap of FIG. 18 taken along section line 21-21 of FIG. 19;

FIG. 22 is a side view of the coolant ring that is a part of a second specific embodiment of a cutting unit assembly;

FIG. 23 is a top view of the coolant ring;

FIG. 24 is a cross-sectional view of the coolant ring of FIG. 22 taken along section line 24-24 of FIG. 23;

FIG. 38 is a top view of a second specific embodiment of a diverter plate for use in the third specific embodiment of the cutting unit assembly of FIG. 30;

FIG. 39 is a cross-sectional view of the diverter plate of FIG. 38 taken along section line 39-39 of FIG. 38;

FIG. 40 is a bottom view of the diverter plate of FIG. 38;

FIG. 41 is an isometric view toward the top surface of the diverter plate of FIG. 38;

FIG. 42 is an isometric view toward the bottom surface of specific embodiment of a diverter plate of FIG. 38;

FIG. 43 is a cross-sectional schematic view of the third specific embodiment of a cutting assembly using the diverter plate of FIG. 38 and showing the flow of coolant through the cutting unit assembly;

FIG. 43A is a cross-sectional view of the shim retaining screw of the third specific embodiment of the cutting assembly;

DETAILED DESCRIPTION

Figure 1:
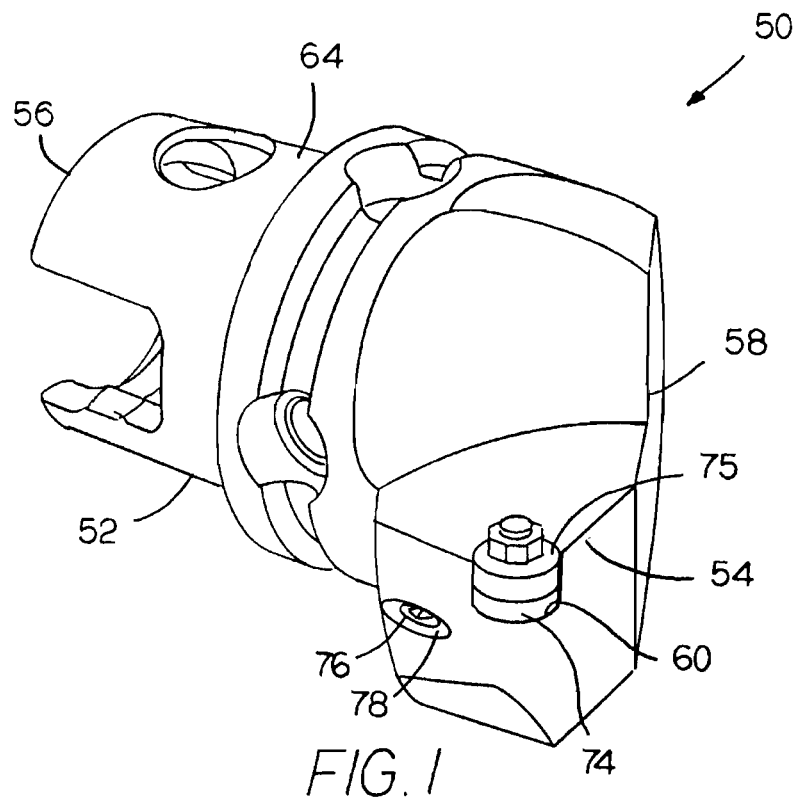
FIG. 1 is an isometric view of a first specific embodiment of a cutting unit assembly.
Figure 2:
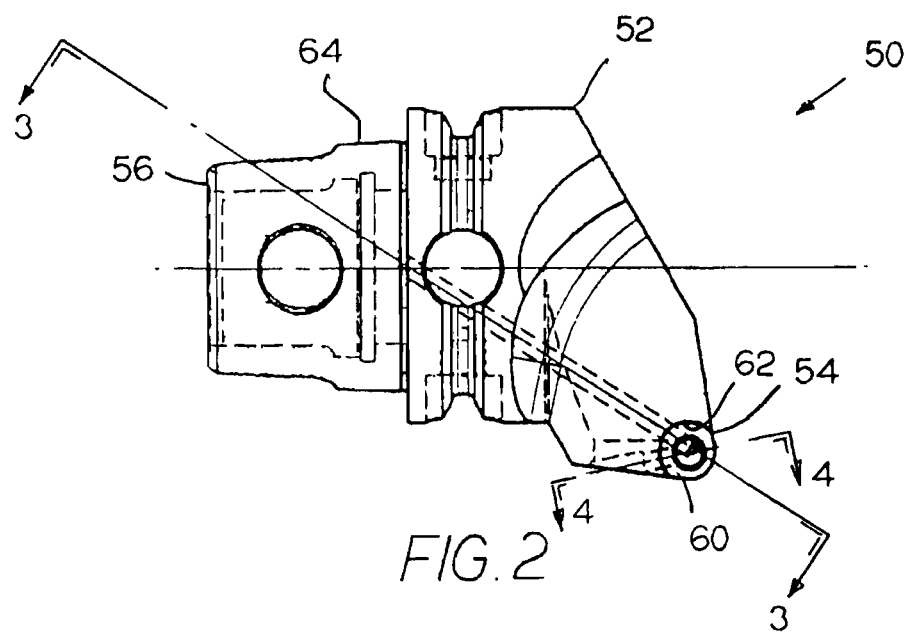
FIG. 2 is a top view of the cutting unit assembly of FIG. 1 with the cutting insert and shim removed.
Figure 3:
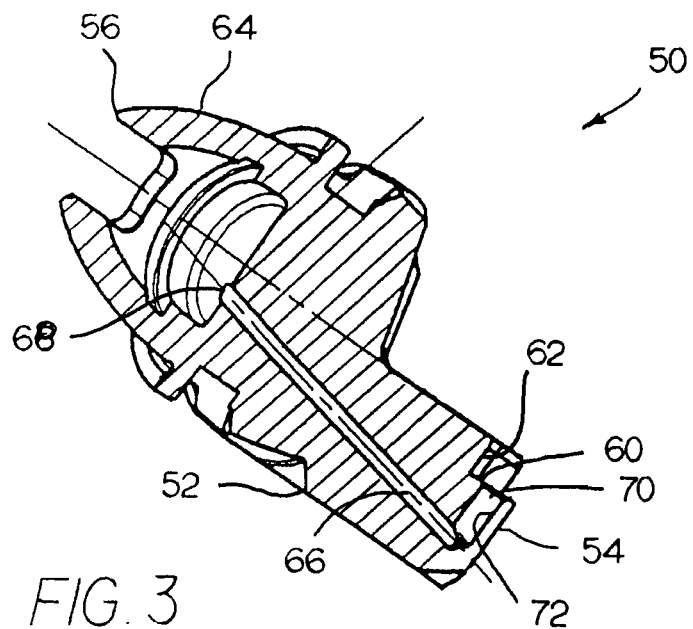
FIG. 3 is a cross-sectional view of the cutting unit assembly of FIG. 1 with the cutting insert and shim removed taken along section line 3-3 of FIG. 2.
Figure 4:
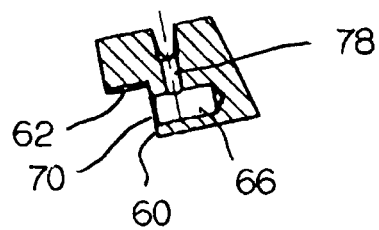
FIG. 4 is a cross-sectional view of the cutting unit assembly of FIG. 1 with the cutting insert and shim removed taken along section line 4-4 of FIG. 2.

In a chipforming material removal operation, the cutting insert engages a workpiece to remove material from a workpiece typically in the form of chips. A material removal operation that removes material from the workpiece in the form of chips typically is known by those skilled in the art as a chipforming material removal operation. The book *Machine Shop Practice* [Industrial Press Inc., New York, N.Y. (1981)] by Moltrecht presents at pages 199-204 a description, inter alia, of chip formation, as well as different kinds of chips (i.e., continuous chip, discontinuous chip, segmental chip). Moltrecht reads [in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . . When the type of metal being cut is ductile, such as steel, the chip will come off in a continuous ribbon . . . ". Moltrecht goes on to describe formation of a discontinuous chip and a segmented chip. As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling. The following patent documents discuss the formation of chips in a material removal operation: U.S. Pat. No. 5,709,907 to Battaglia et al. (assigned to Kennametal Inc.), U.S. Pat. No. 5,722,803 to Battaglia et al. (assigned to Kennametal Inc.), and U.S. Pat. No. 6,161,990 to Oles et al. (assigned to Kennametal Inc.).

Referring to the drawings including without limitation FIGS. 1-4, a first specific embodiment of a cutting unit assembly is generally designated as 50. Cutting unit assembly 50 includes a holder 52 that has a forward working end 54 and a rearward end 56. The holder 52 has an enlarged head 58, which is adjacent to the forward working end 54, that presents a seating surface or seat 60 adapted to receive a shim 74 and a cutting insert 75 wherein the shim 74 and cutting insert 75 are secured to the seat 60 as will be described hereinafter. The seat 60 is surrounded by an upstanding semi-circular wall 62, which is disposed at an angle of 90 degrees with respect to the surface of the seat 60, wherein the wall 62 provides support in one direction for the shim 74 and cutting insert 75 when positioned on and secured to the seat 60. The holder 52 further includes a shank 64 adjacent to the rearward end 56 thereof. The cutting unit assembly attaches at the shank 64 to a larger machine tool.

The holder 52 further contains a coolant passage 66 which has an entrance 68 adjacent to the shank 64 and an exit 70 at the seat 60. As will be described hereinafter, coolant, which is under pressure, enters the coolant passage 66 through the entrance 68 and exits via the exit 70 at the seat 60 directly into the assembly of components comprising the insert locking cap 80, the stud 120, the shim 74 and the cutting insert 75. Coolant emits from this cutting unit assembly to impinge upon the interface between the cutting insert and workpiece, i.e., the cutting insert-workpiece interface. The holder 52 includes a set screw bore 78 that receives a set screw 76 wherein the set screw 76 helps secure the stud 120 in position as will be described hereinafter.

Figure 5:
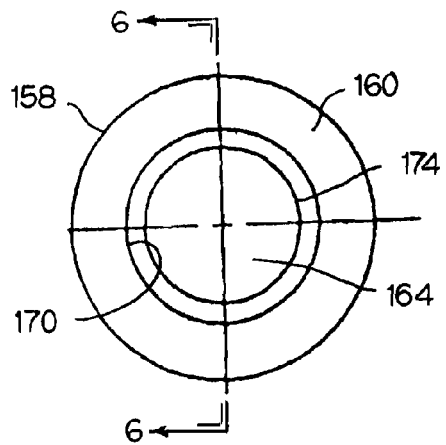
FIG. 5 is a top view of the shim, which is a part of the cutting unit assembly of FIG. 1.
Figure 6:
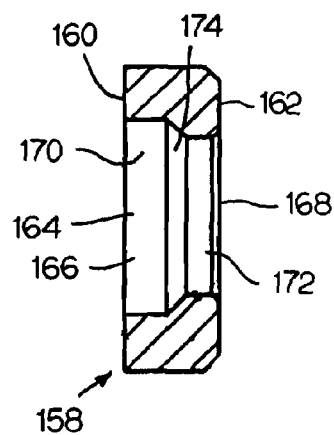
FIG. 6 is a cross-sectional view of the shim of FIG. 5 taken along the section line 6-6 of FIG. 5.

Referring to the drawings including without limitation FIGS. 5 and 6, the shim 74 of the cutting unit assembly 50 further includes a shim body 158 wherein the shim body 158 has an upper surface 160 and a lower surface 162. Shim body 158 further includes a central shim bore 164 that has an entrance 168 and an exit 166. The central shim bore 164 has an enlarged diameter section 170 adjacent to the exit 166 and a reduced diameter section 172 adjacent to the entrance 168. The enlarged diameter section 170 and the reduced diameter section 172 are joined together by a frusto-conical section 174.

Figure 7:
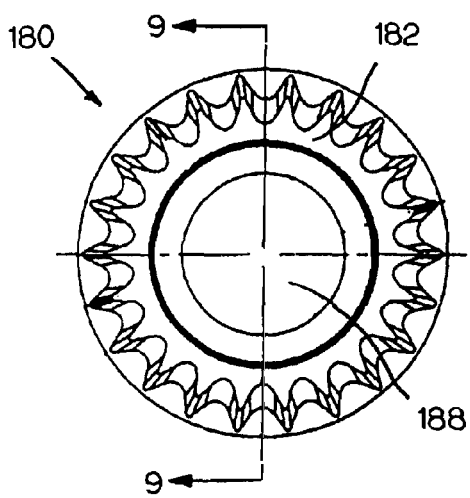
FIG. 7 is a top view of the round cutting insert, which is a part of the cutting unit assembly of FIG. 1.
Figure 8:
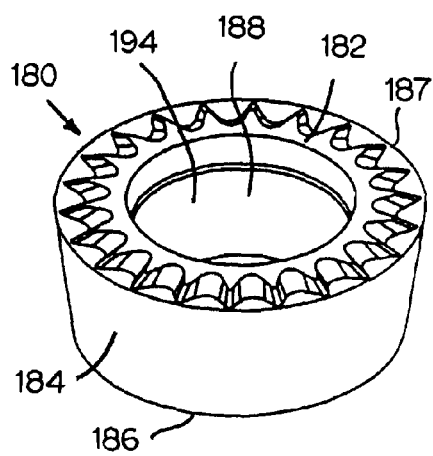
FIG. 8 is an isometric view of the round cutting insert of FIG. 7.
Figure 9:
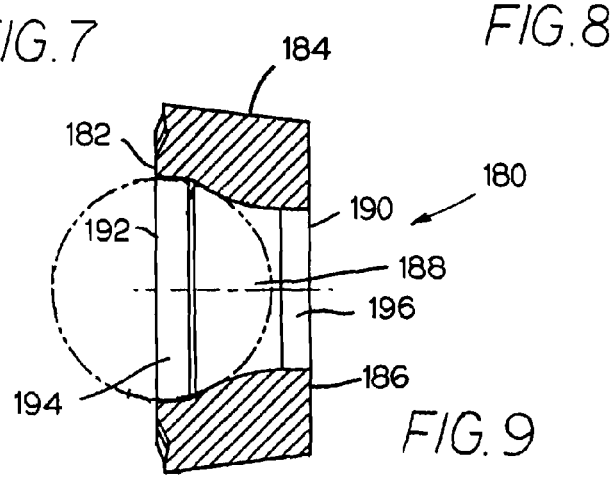
FIG. 9 is a cross-sectional view of the round cutting insert of FIG. 7 taken along section line 9-9 of FIG. 7.

Referring to the drawings including without limitation FIGS. 7-9, the cutting insert 75 of the cutting unit assembly 50 includes a round cutting insert body 180 that has a rake surface 182, a flank surface 184, and a bottom surface 186. There is a cutting edge 187 at the juncture between the rake surface 182 and the flank surface 184. The round cutting insert body 180 contains a central bore 188 that includes an entrance 190 and an exit 192. The central bore 188 also has an upper portion 194, which is adjacent to exit 192 and has an enlarged diameter, and a lower portion 196, which is adjacent to the entrance 190 and has a reduced diameter.

As will become apparent, the cutting unit assembly 50 includes an insert locking cap 80 and the stud 120 that together secure the shim 74 and cutting insert 75 to the holder 52. The assembly of the insert locking cap 80 and the threaded stud 120 also provide a means by which coolant travels to the cutting insert-workpiece interface. Referring to the drawings including without limitation FIGS. 10-12, the insert locking cap 80 has an axial forward and 82 and an axial rearward end 84. The insert locking cap 80 has a head portion 86 adjacent the axial forward and 82 wherein the head portion 86 includes a plurality (i.e., six) flats 88. These flats 88 facilitate tightening the insert locking cap 80 into position. The insert locking cap 80 has a shank portion 92 adjacent the axial rearward end 84. The shank portion 92 includes a shoulder 94 that joins the head portion 86 and the shank portion 92. The shank portion 92 further has a cylindrical surface 96 and a frusto-conical surface 98. The insert locking cap 80 contains a central locking cap bore 100 which has an entrance 102 and an exit 104. A portion of the central locking cap bore 100 presents threads 106. The insert locking cap 80 further includes a cut-out portion 108 which defines an integral opening 110 and an arcuate ledge 112. The integral opening 110 communicates with the locking cap bore 100.

Figure 13:
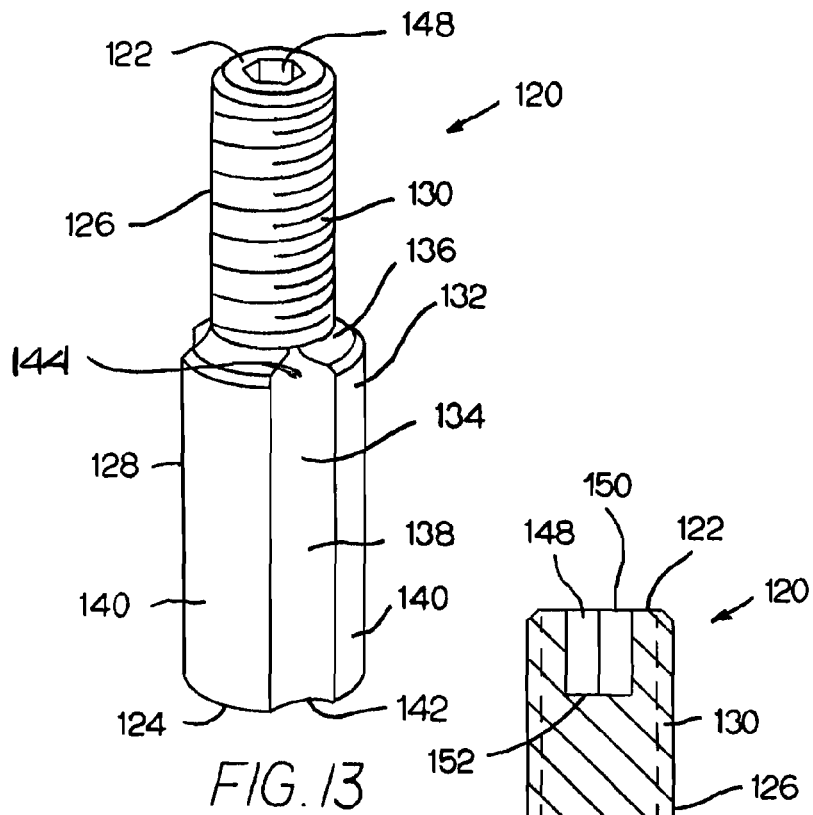
FIG. 13 is an isometric view of the stud, which is a part of the cutting unit assembly of FIG. 1.
Figure 15:
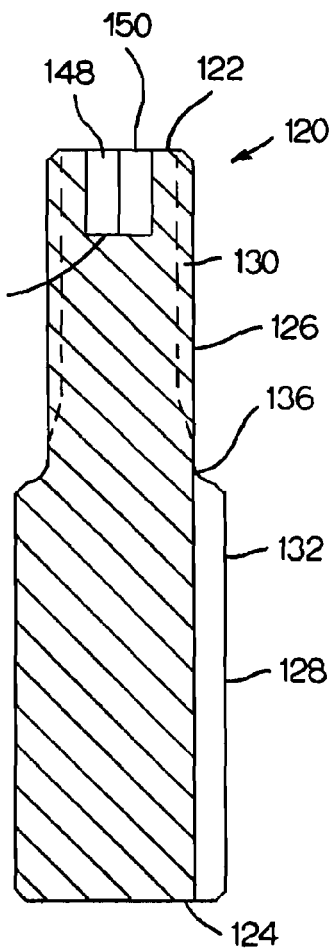
FIG. 15 is a cross-sectional view of the stud taken along section line 15-15 of FIG. 14.
Figure 14:
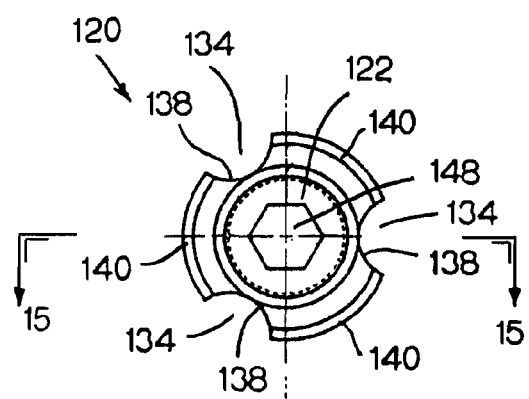
FIG. 14 is a top view of the stud of FIG. 13.

Referring to the drawings including without limitation FIGS. 13-15, the threaded stud 120 has an axial forward end 122 and an axial rearward end 124. Stud 120 has an upper reduced diameter portion 126 adjacent the axial forward end 122 and a lower enlarged diameter portion 128 adjacent the axial rearward end 124. The external surface of the stud 120 presents a threaded region 130 and a smooth surface region 132. The smooth surface region 132 includes a trio of longitudinal troughs 134. Each longitudinal trough 134 has an entrance 142 and an exit 144. The threaded region 130 joins the smooth region 132 at a shoulder 136 as shown in FIGS. 13 and 15. Each of the longitudinal troughs 134 has an arcuate trough surface 136. An arcuate surface or land 140 in the smooth surface region 132 separates each one of the longitudinal troughs 134 from each other. Threaded stud 120 includes a hexagonal closed bore 148 at the axial forward end 122. Hexagonal closed bore 148 includes an opening 150 and a termination surface or end 152.

Referring to the drawings including without limitation FIGS. 16-17, the assembly and operation of the first specific embodiment of the cutting unit assembly 50 is described below.

Figure 17:
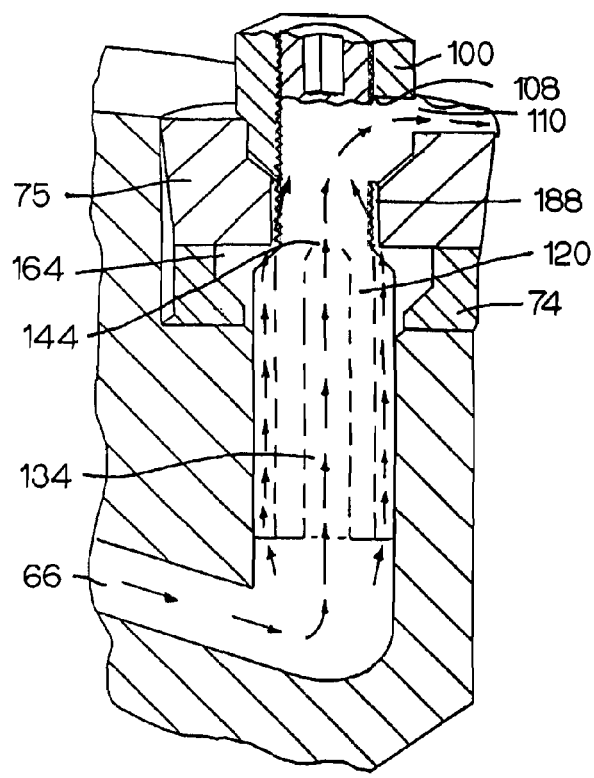
FIG. 17 is a cross-sectional schematic view of one specific embodiment of the cutting unit assembly of FIG. 1 showing the travel of coolant.

FIG. 17 is a cross-sectional schematic view of the assembly that shows the flow of coolant (as shown by arrows) from the coolant passage 66 and through the assembly of the central locking cap 100—the stud 120—the shim 74—the cutting insert 75. Coolant, which is typically under pressure, flows from the coolant passage 66 through the exterior longitudinal troughs 134 of the threaded stud 120 in an upward direction as shown by the arrows in FIG. 17. Coolant exits the exits 144 (at the upper end as shown in FIG. 17) of the exterior longitudinal troughs 134 into the volume of the central shim bore 164 and at least a part of the volume of the central aperture 188 of the cutting insert 75. Coolant continues to flow into the cutout portion 108 of the insert locking cap 80 exiting the side opening 110 under pressure so as to spray towards the cutting insert-workpiece interface.

The position of the threaded stud 120 can be rotated to a pre-selected position by rotating the stud 120 in the coolant passage 66 to the desired position. The stud 120 can then be secured in position by tightening the set screw 76 to where the set screw 76 firmly abuts against the threaded stud 120. The insert locking cap 80 threads at the threads 106 onto the threaded region 130 of the stud 120 in such a fashion so that as the insert locking cap 80 is tightened, there is a significant compressive bias against the cutting insert 75 thereby strongly securing the cutting insert 75 and the shim 74 in position on the seat 60 of the holder 52. More specifically, the cutting insert 75 is sandwiched between the insert locking cap 80 and the shim 74 is sandwiched between the cutting insert 75 and the seat or seating surface 60.

Figure 16:
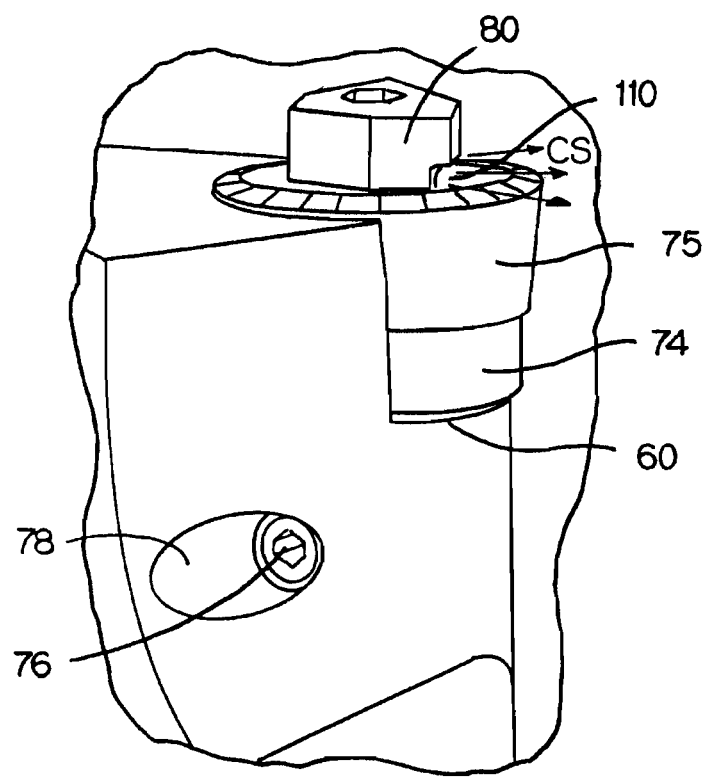
FIG. 16 is an isometric view of the cutting unit assembly of FIG. 1 showing the cutting unit assembly in one orientation.

FIG. 16 shows the coolant spray (CS) in one orientation. As described above, there should be an appreciation that the direction of the coolant spray can vary depending upon the position of the stud 120 in the coolant passage 66. A variation in the direction of the coolant spray can accommodate various cutting applications.

Figure 29:
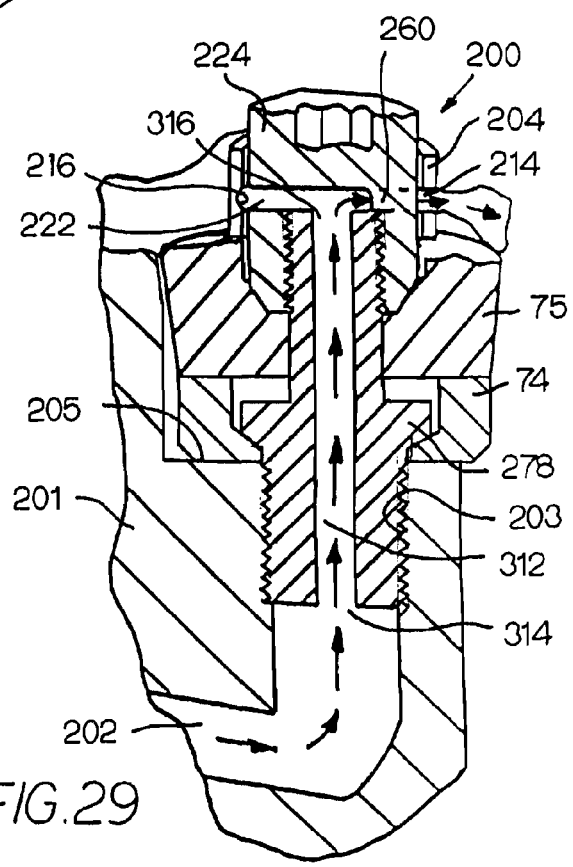
FIG. 29 is a cross-sectional schematic view of the second specific embodiment of the cutting unit assembly of FIG. 28 showing the travel of coolant through the cutting unit assembly.
Figure 25:
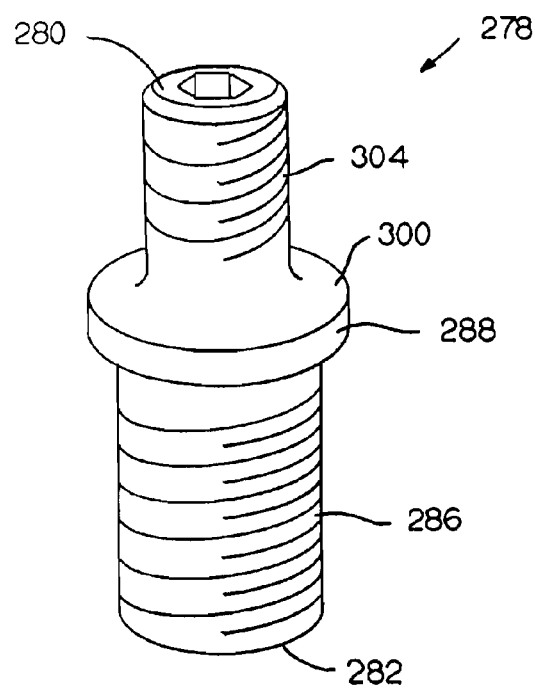
FIG. 25 is an isometric view of a specific embodiment of a threaded stud that is a part of a second specific embodiment of a cutting unit assembly.
Figures 26, 27:
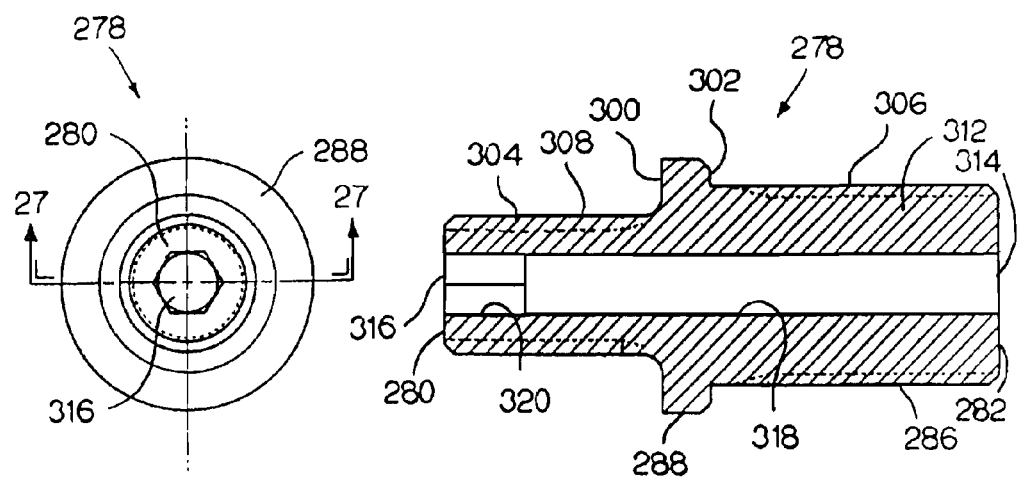
FIG. 26 is a top view of the threaded stud of FIG. 25.
FIG. 27 is a cross-sectional view of the threaded stud of FIG. 25 taken along section line 27-27 of FIG. 26.
Figure 28:
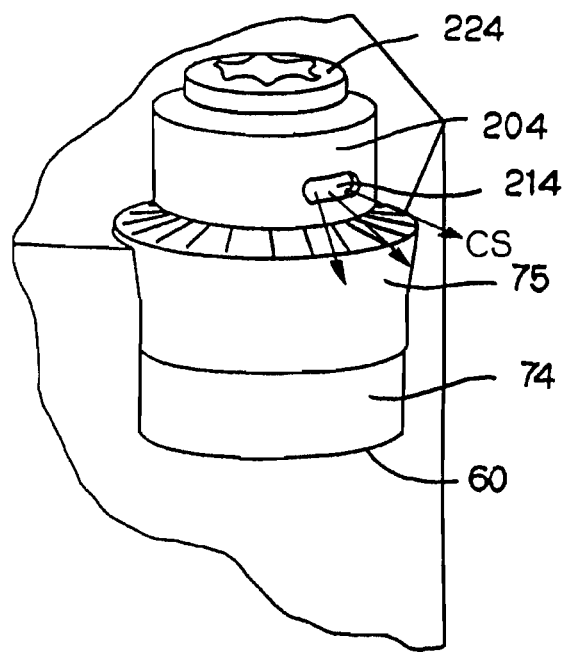
FIG. 28 is an isometric view of the second specific embodiment of a cutting unit assembly showing the cutting unit assembly in one orientation with regard to coolant spraying toward the cutting insert-workpiece interface.
Figure 28A:
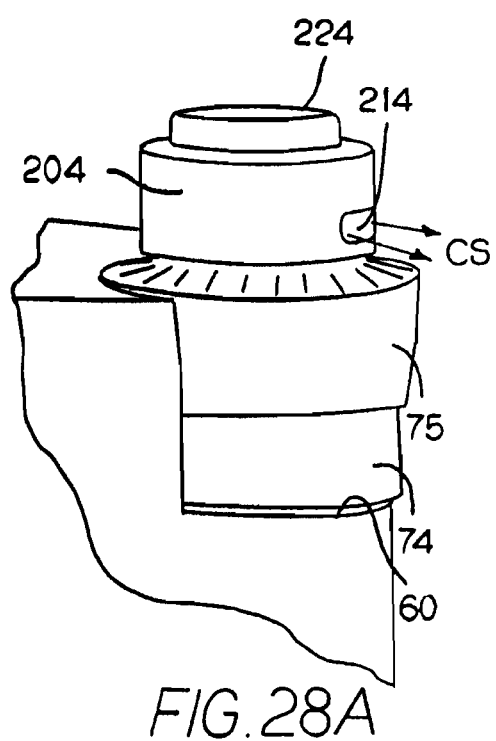
FIG. 28A is an isometric view of the second specific embodiment of a cutting unit assembly showing the cutting unit assembly in another orientation with regard to coolant spraying toward the cutting insert-workpiece interface.

Referring to the drawings including without limitation FIGS. 17-29, there is illustrated a second specific embodiment of a cutting unit assembly, which is generally designated as 200 in FIG. 29, includes a holder 201 which contains a coolant passage 202 wherein the coolant passage 202 has a threaded section 203 adjacent to the seat 205. A threaded stud 278 threadedly engages the coolant passage 202 adjacent the exit thereof. The threaded stud 278 passes through the shim 74 and the cutting insert 75. An insert locking cap 224 attaches to the threaded stud 278 and a coolant ring 204 encompasses the insert locking cap 224. The details of the cutting unit assembly 200 are set forth hereinafter.

The cutting unit assembly contains a threaded stud 278 that has an axial forward end 280 and an axial rearward end 282. Threaded stud 278 has a lower enlarged diameter section 286 as well as an integral flange 288 and has a forwardly facing shoulder 300 and a rearwardly facing shoulder 302. The threaded stud 278 further has an upper reduced diameter portion 304 which presents a lower threaded section 306. The threaded stud 278 has a central longitudinal bore 312 that has an entrance 314 and an exit 316. The central longitudinal bore 312 has a circular section 318 and a hexagonal section 320.

The cutting unit assembly 200 also includes an insert locking cap 224 that has an axial forward end 226 and an axial rearward end 228. The insert locking cap 224 further has a head portion 230 and a shank portion 232. The head portion 230 has a reduced diameter cylindrical portion 234 and an enlarged diameter cylindrical portion 236 joined together by a frusto-conical shoulder 238. The head portion 230 further contains an annular groove 240. The head portion 230 further has threads 231. The shank portion 232 includes a cylindrical section 246 that is continuous with a frusto-conical section 248. The insert locking cap 224 contains a longitudinal locking cap bore 252 that has an entrance 254 and an inner termination surface 256. The insert locking cap 224 further has a transverse locking cap bore 260 that has an inner entrance 262 and an outer exit 264. The insert locking cap 224 has an upper closed sinusoidal bore 268 that has an entrance 270 and a termination surface 272.

The cutting unit assembly 200 also includes a coolant ring 204 which has a top 206 and a bottom and 208. Coolant ring 204 further has an exterior surface 210 and an interior volume 212 wherein there is an opening 214 in the coolant ring 204. Coolant ring 204 further includes an interior groove 216. There should be an appreciation that the interior groove 216 of the coolant ring 204 cooperates with the annular groove 240 of the insert locking cap 224 to form a coolant passage 222. The coolant ring 204 threads onto the insert locking cap 224 at threads 231 via interior threads that are very fine.

Referring to the drawings and without limitation to FIG. 29, FIG. 29 is a cross-sectional schematic view that shows the flow of coolant in the coolant passage 202 through the assembly of the coolant ring 204—insert locking cap 224—threaded stud 278—cutting insert 75—shim 74. In this kind of assembly coolant is typically under pressure so that coolant flows in and out of the coolant passage 202 into the entrance 314 of the central longitudinal bore 312 of the threaded stud 278. Coolant exits the central longitudinal bore 312 at exit 316 thereof, and then flows into the transverse locking cap bore 260 via the inner entrance 262 thereof. Coolant then exits into the transverse locking cap bore 260 and passes into the coolant channel 222 whereby coolant sprays out of the opening 214 toward the cutting insert-workpiece interface.

Insert locking cap 224 threads into the threaded section 306 of the threaded stud 278 to such an extent so as to exert a bias against the cutting insert 75 thereby securing both the cutting insert 75 and shim 74 to seat 60. The threaded stud 278 threads into the coolant passage 202. By varying the extent the coolant ring 204 is threaded onto the insert locking cap 224, the coolant ring 204 can vary its position relative to the insert locking cap 224 so as to vary the orientation of the opening 214 and hence the direction of the coolant spray.

Figure 30:
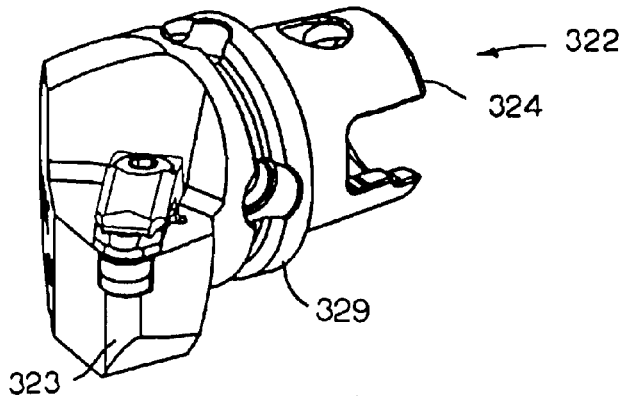
FIG. 30 is an isometric view of a third specific embodiment of a cutting unit assembly.
Figure 31:
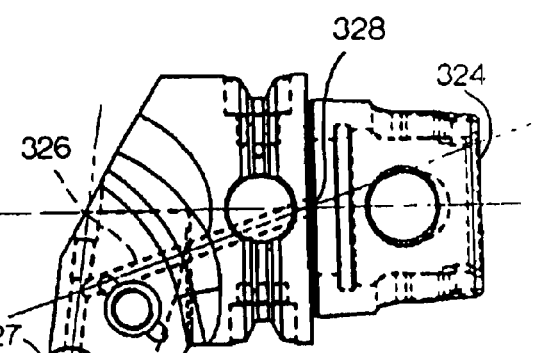
FIG. 31 is a top view of the cutting unit assembly of FIG. 30.
Figure 32:
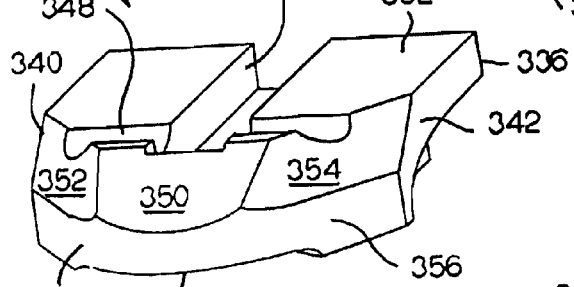
FIG. 32 is an isometric view toward the top surface of one specific embodiment of a diverter plate for use in the third specific embodiment of the cutting unit assembly of FIG. 30.
Figure 33:
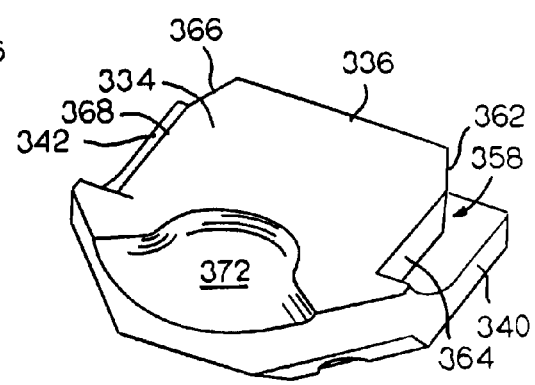
FIG. 33 is an isometric view toward the bottom surface of specific embodiment of a diverter plate of FIG. 32.
Figure 34:
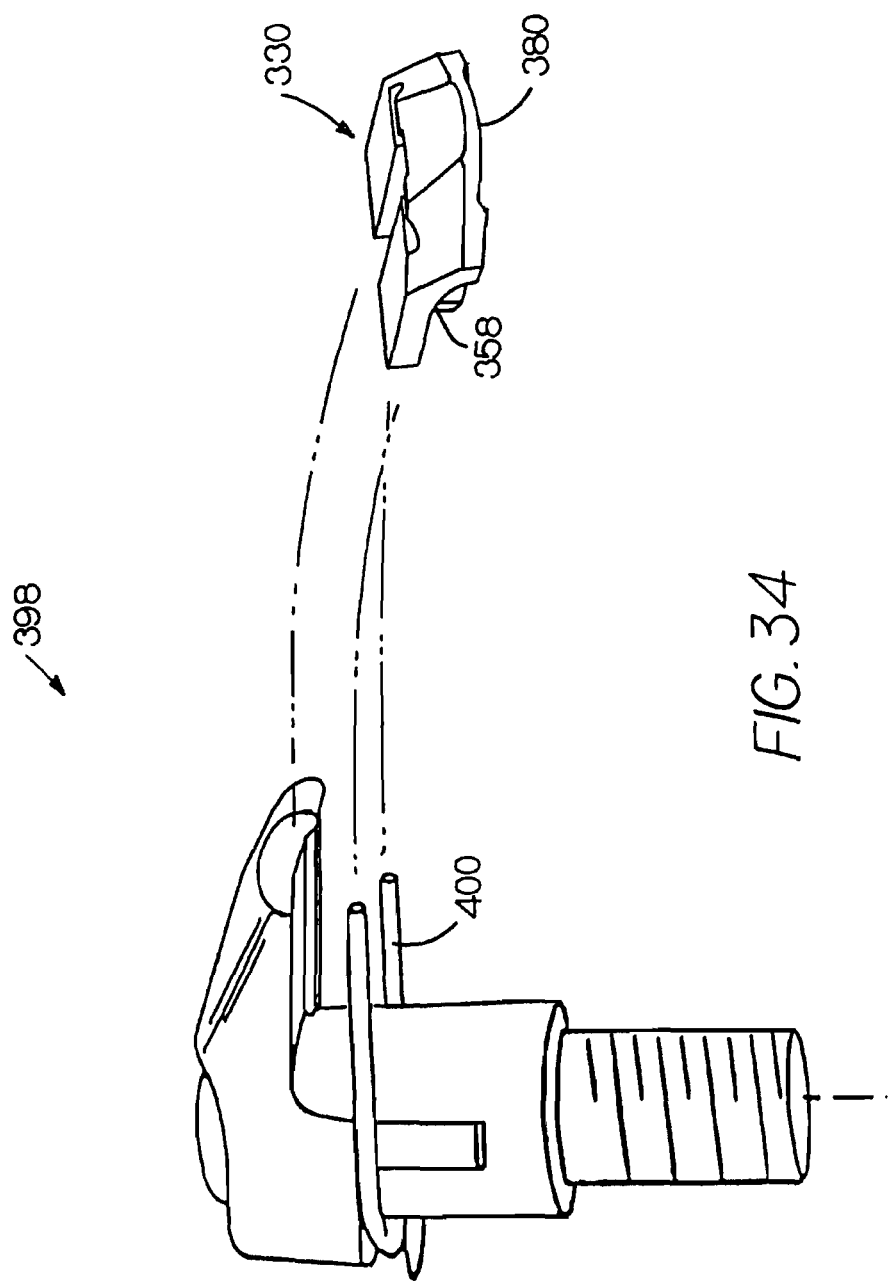
FIG. 34 is an isometric view of the clamp assembly of the third specific embodiment of FIG. 30 wherein the diverter plate of FIG. 32 is exploded away from the screw-clamp arm assembly.
Figure 35:
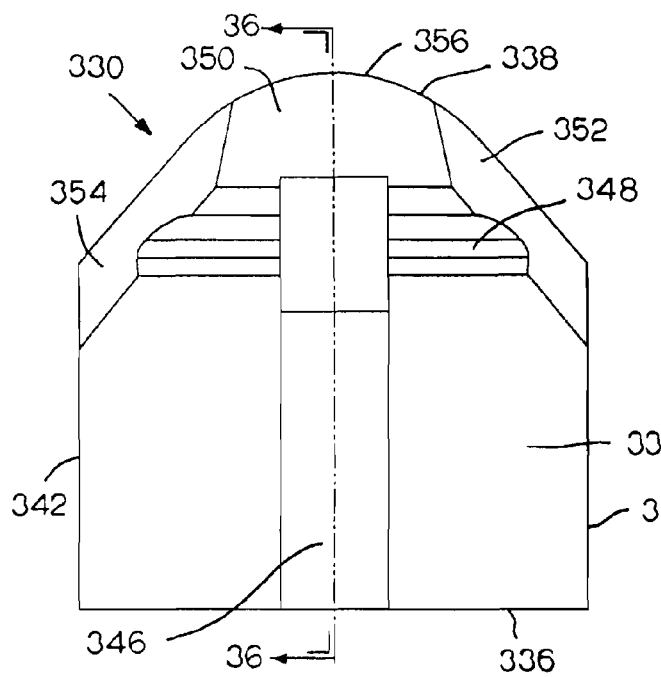
FIG. 35 is a top view of the diverter plate of FIG. 32.
Figure 36:
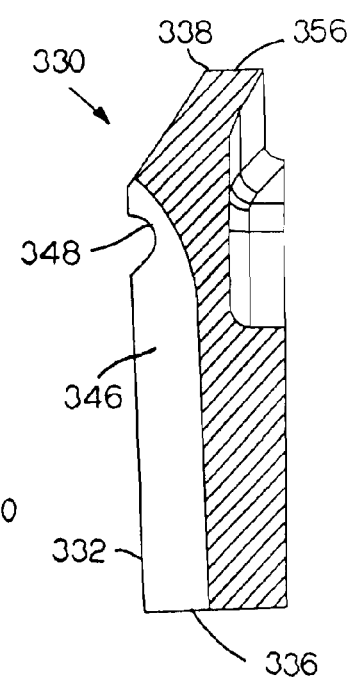
FIG. 36 is a cross-sectional view of the diverter plate of FIG. 32 taken along section line 36-36 of FIG. 35.
Figure 37:
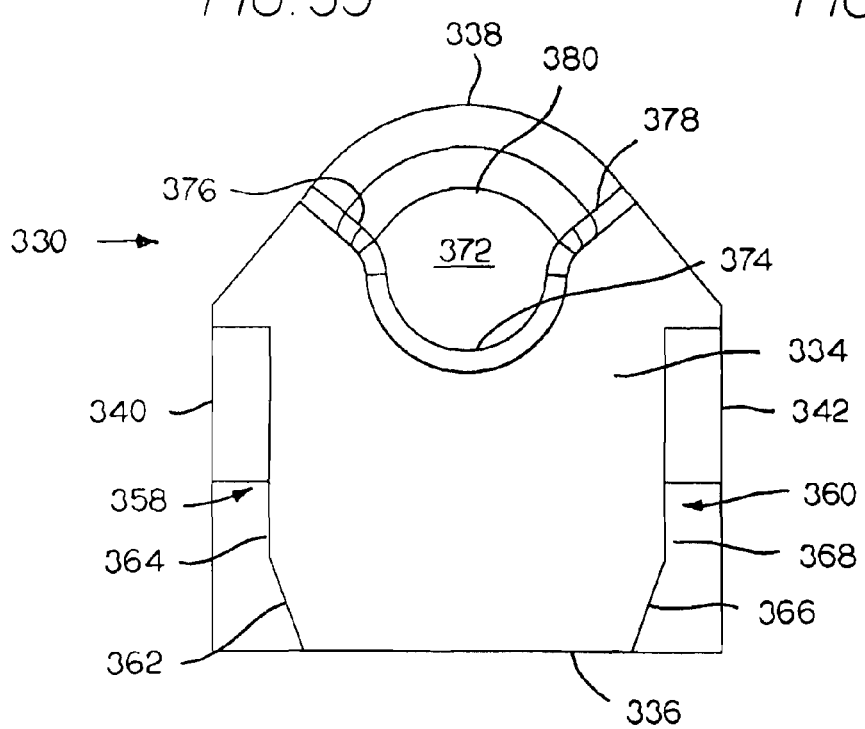
FIG. 37 is a bottom view of the diverter plate of FIG. 32.
Figure 44:
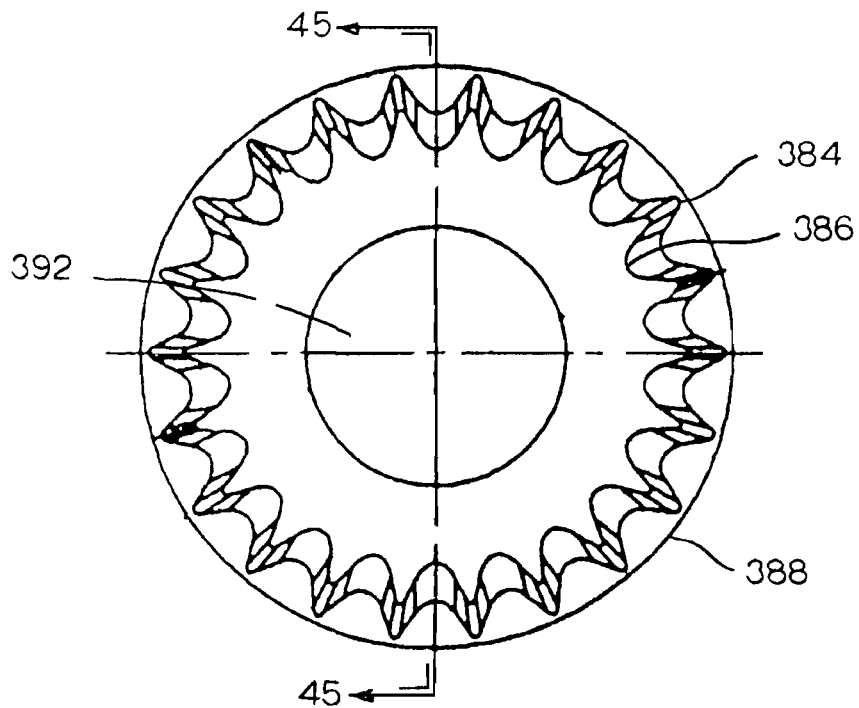
FIG. 44 is a top view of a round cutting insert for use in the third specific embodiment of the cutting unit assembly of FIG. 30.
Figure 45:
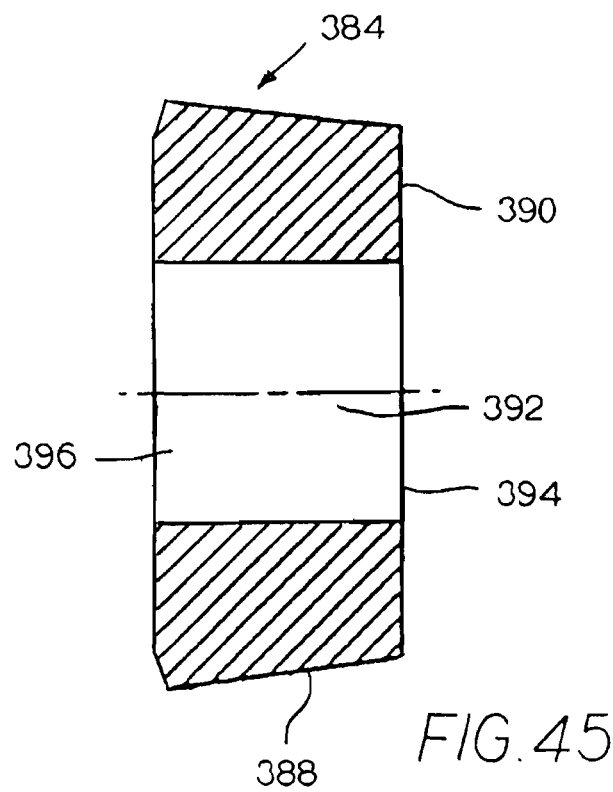
FIG. 45 is a cross-sectional view of the round cutting insert of FIG. 44 taken along section line 45-45 of FIG. 44.

Referring to FIG. 30, a third specific embodiment of the cutting unit assembly generally designated as 322 includes a holder 329 that has a forward end 323 and a rearward end 324. The holder 329 presents a seat 325 as well as contains a coolant passage 326 that has an exit 327 and an entrance 328. The exit 327 of the coolant passage 326 is at the seat 325.

The cutting unit assembly further includes a diverter plate 330 that has a top surface 332, a bottom surface 334, a rear end 336, a forward end 338, a side surface 340, and an opposite side surface 342. The diverter plate 330 contains in the top surface 332 a longitudinal groove 346 and a transverse groove 348. The diverter plate 330 further has a central sloped surface 350, a lateral sloped surface 352, a lateral sloped surface 354, and an arcuate forward surface 356. Side surface 340 includes a lateral groove 358 that includes a beveled surface 362 and a straight surface 364. Side surface 342 includes a lateral groove 360 that includes a beveled surface 366 and a straight surface 368. The bottom surface 334 of the diverter plate 330 defines a bowl 372 that is defined in part by a semicircular wall 374 as well as a pair of opposite flared walls 376 in 378. Bowl 372 further has an opening 380.

The cutting unit assembly 322 also includes around cutting insert body 384 that has a rake surface 386, a flank surface 388, and a bottom surface 390. The round cutting insert body 384 contains a central bore 392 that has an entrance 394 and an exit 396. The central bore 392 has a generally constant diameter. The cutting unit assembly 322 also uses a shim 74 like the earlier described shims 74. Referring to FIG. 43A, the cutting insert assembly 322 also has a shim retaining screw 456. Shim retaining screw 456 has a central longitudinal bore 458, a flange 460, and a threaded portion 462.

The diverter plate 330 is attached to the clamp assembly 398 via prongs 400 that engage the diverter plate 330 at the lateral grooves 358, 360. This kind of connection allows the diverter plate 330 to be changed depending upon the specific application.

Referring to FIG. 43, the shim 74 is positioned on the seat 325 and the shim retaining screw 456 is threadedly received in a threaded portion of the coolant passage 326. The flange 460 of the shim retaining screw 456 engages the frusto-conical section 174 of the shim 74 to retain the shim 74 to the seat 325. The cutting insert 384 rests on the top of the shim 74. The diverter plate 330 is pressed down by the clamp assembly 398 biases against the rake surface of the cutting insert 384 to retain the cutting insert 384 in position. Coolant then flows through the coolant passage 326 and into the central longitudinal bore 458 of the shim retaining screw 456. The coolant then flows through the central bore 392 of the cutting insert 384. Coolant impinges the surface of the bowl 372 of the diverter plate 330 wherein the coolant exits the bowl 372 through the opening 380 towards the cutting insert-workpiece interface.

Referring to FIGS. 38-42, another specific embodiment of the diverter plate 402 includes a top surface 404, a bottom surface 406, a rear end 408, a forward end 410, and a pair of opposite side surfaces 412, 414. The top surface 404 of the diverter plate 402 contains a longitudinal groove 418 and a transverse groove 420. Top surface 404 further includes a central sloped surface 422, and a pair of opposite lateral sloped surfaces 424, 426. Further, the diverter plate 402 includes an arcuate forward surface 428. Side surface 412 includes a lateral groove 430 that includes a beveled surface 434 and a straight surface 436. Side surface 414 contains a lateral groove 432 that includes a beveled surface 438 and a straight surface 440. The bottom surface 406 of the diverter plate 402 contains a bowl 444 that is defined at least in part by a semi-circular wall 446 in the pair of opposite flared walls 448, 450. There are a plurality of openings 452 that provide communication out of the bowl 444.

There should be an appreciation that any one of a number of different kinds of fluid or coolant are suitable for use in the cutting insert. Broadly speaking, there are two basic categories of fluids or coolants; namely, oil-based fluids which include straight oils and soluble oils, and chemical fluids which include synthetic and semisynthetic coolants. Straight oils are composed of a base mineral or petroleum oil and often contain polar lubricants such as fats, vegetable oils, and esters, as well as extreme pressure additives of chlorine, sulfur and phosphorus. Soluble oils (also called emulsion fluid) are composed of a base of petroleum or mineral oil combined with emulsifiers and blending agents Petroleum or mineral oil combined with emulsifiers and blending agents are basic components of soluble oils (also called emulsifiable oils). The concentration of listed components in their water mixture is usually between 30-85%. Usually the soaps, wetting agents, and couplers are used as emulsifiers, and their basic role is to reduce the surface tension. As a result they can cause a fluid tendency to foam. In addition, soluble oils can contain oiliness agents such as ester, extreme pressure additives, alkanolamines to provide Òreserve alkalinityÓ, a biocide such as triazine or oxazolidene, a defoamer such as a long chain organic fatty alcohol or salt, corrosion inhibitors, antioxidants, etc.

Synthetic fluids (chemical fluids) can be further categorized into two subgroups: true solutions and surface active fluids. True solution fluids are composed essentially of alkaline inorganic and organic compounds and are formulated to impart corrosion protection to water. Chemical surface-active fluids are composed of alkaline inorganic and organic corrosion inhibitors combined with anionic non-ionic wetting agents to provide lubrication and improve wetting ability. Extreme-pressure lubricants based on chlorine, sulfur, and phosphorus, as well as some of the more recently developed polymer physical extreme-pressure agents can be additionally incorporated in this fluids. Semisynthetics fluids (also called semi-chemical) contains a lower amount of refined base oil (5-30%) in the concentrate. They are additionally mixed with emulsifiers, as well as 30-50% of water. Since they include both constituents of synthetic and soluble oils, characteristic properties common to both synthetics and water soluble oils are presented.

It is apparent that the present invention provides a cutting assembly, as well as a cutting insert assembly, to facilitate enhanced delivery of coolant adjacent the interface between the cutting insert and the workpiece (i.e., the insert-chip interface). By doing so, there is a diminishment of excessive heat at the insert-chip interface in the chipforming removal of material from a workpiece. By providing coolant flow, there is a reduction in excessive heat at the insert-chip interface to eliminate or reduce build up of chip material. By providing the flow of coolant to the insert-chip interface, the evacuation of chips from the insert-chip interface will be facilitated thereby minimizing the potential that a chip will be re-cut. It is apparent the present invention provides advantages connected with decreasing the heat at the insert-chip interface The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting assembly for the chipforming removal of material from a workpiece at the cutting insert-workpiece interface, the cutting assembly comprising:
  a holder containing a coolant passage and a seat;
  a stud being received within the coolant passage and extending away from the seat;
  a cutting insert having a rake surface and a central aperture wherein the stud extends through the central aperture of the cutting insert;
  an insert locking cap engaging the stud and exerting a biasing force against the rake surface of the cutting insert so as to securely retain the cutting insert in the seat (60), the insert locking cap containing a side opening in communication with the central aperture (188) of the cutting insert; and the stud containing an exterior longitudinal trough with an entrance in the coolant passage and an exit adjacent the side opening whereby coolant flows from the coolant passage into the exterior longitudinal troughs exiting into the central aperture of the cutting insert and passing into and spraying out of the side opening toward the cutting insert-workpiece interface.

2. The cutting assembly according to claim 1 wherein the stud having a smooth region wherein the smooth region contains the exterior longitudinal trough, and a portion of the smooth region of the stud being within the coolant passage.

3. The cutting assembly according to claim 2 wherein the smooth region contains a plurality of the longitudinal troughs.

4. The cutting assembly according to claim 1 wherein the stud can be selectively rotationally positioned to a pre-selected position in the coolant passage.

5. The cutting assembly according to claim 4 wherein the holder further contains a set screw bore that receives a set screw, and the set screw being movable between a fastening position in which the set screw firmly abuts against the stud to retain the stud in the pre-selected position in the coolant passage and an unfastening position in which the set screw does not contact the stud whereby the stud is free to be selectively rotationally positioned in the coolant passage.

6. The cutting assembly according to claim 1 further including a shim having a central shim bore, and the stud passing through the central shim bore, and the shim being sandwiched between the cutting insert and the seat.

7. The cutting assembly according to claim 6 wherein the central shim bore being in communication with the central aperture of the cutting insert, and the exterior longitudinal trough being in communication with the central shim bore.

8. The cutting assembly according to claim 1 wherein the stud having a threaded region, and the insert locking cap threadedly engaging the stud at the threaded region (130).

9. A cutting assembly for the chipforming removal of material from a workpiece at the cutting insert-workpiece interface, the cutting assembly comprising:

a holder containing a coolant passage and a seat;

a threaded stud being threadedly received at a lower threaded section thereof within the coolant passage and extending away from the seat;

a cutting insert having a rake surface and a central aperture wherein an upper threaded section of the threaded stud extends through the central aperture of the cutting insert;

an insert locking cap engaging the upper threaded section of the threaded stud, and the insert locking cap exerting a biasing force against the rake surface of the cutting insert so as to securely retain the cutting insert in the seat, the insert locking cap containing a transverse locking cap bore and an outer exit in communication with the transverse locking cap bore, and the insert locking cap containing an exterior annular groove in communication with the transverse locking cap bore through the outer exit;

a coolant ring being adjustably received on the insert locking cap so as to encompass the exterior annular groove, the coolant ring containing an interior groove which together with the exterior annular groove forms a coolant channel, and the coolant ring containing an opening in communication with the coolant channel; and the threaded stud containing a central longitudinal bore with an entrance in the coolant passage and an exit adjacent the transverse locking cap bore whereby coolant flows from the coolant passage and into the central longitudinal bore exiting into the transverse locking cap bore and passing into the coolant channel whereby coolant sprays out of the opening toward the cutting insert-workpiece interface.

10. The cutting assembly according to claim 9 wherein the coolant ring being adjustable so as to select the orientation of the coolant spraying out of the opening towards the cutting insert-workpiece interface.

11. The cutting assembly according to claim 9 further including a shim having a central shim bore, and the threaded stud passing through the central shim bore, and the shim being sandwiched between the cutting insert and the seat.

* * * * *